United States Patent
Hammond

(10) Patent No.: US 7,126,610 B2
(45) Date of Patent: Oct. 24, 2006

(54) SYSTEM AND METHOD FOR IMAGE LUMINANCE TRANSFORMATION

(75) Inventor: Scott G. Hammond, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 10/901,847

(22) Filed: Jul. 28, 2004

(65) Prior Publication Data
US 2006/0022993 A1 Feb. 2, 2006

(51) Int. Cl.
G06K 9/00 (2006.01)

(52) U.S. Cl. .............. 345/589; 345/593; 382/167; 358/518

(58) Field of Classification Search ........ 345/589–594, 345/597, 600–604; 348/70–71, 496, 502, 348/498, 514, 520, 527, 557, 577, 582, 602–603, 348/612, 655, 677, 679; 382/162–167; 358/515–520, 358/527
See application file for complete search history.

(56) References Cited

U.S. PATENT DOCUMENTS

| | | | | |
|---|---|---|---|---|
| 4,876,651 A * | 10/1989 | Dawson et al. | ............. | 701/200 |
| 5,956,015 A * | 9/1999 | Hino | ............. | 345/600 |
| 5,963,201 A * | 10/1999 | McGreggor et al. | ........ | 715/722 |
| 6,388,821 B1 * | 5/2002 | Dehmlow | ............. | 359/744 |
| 6,727,942 B1 * | 4/2004 | Miyano | ............. | 348/223.1 |
| 2003/0099393 A1 * | 5/2003 | Oshiumi et al. | ............. | 382/150 |
| 2004/0021885 A1 * | 2/2004 | Nishikawa | ............. | 358/1.9 |
| 2004/0151370 A1 * | 8/2004 | Sasaki | ............. | 382/162 |
| 2004/0178973 A1 * | 9/2004 | Miller et al. | ............. | 345/82 |

* cited by examiner

Primary Examiner—Matthew C. Bella
Assistant Examiner—Wesner Sajous
(74) Attorney, Agent, or Firm—Andrew A. Abeyta

(57) ABSTRACT

An image conversion system for altering an image to adjust the overall brightness of the image when displayed is provided. The image conversion system includes a luminance transformer and a color adjuster. To adjust the overall brightness of the image, the luminance transformer reverses the luminance of each original color in the image. The new luminance of each transformed color is then compared to the desired luminance for that color. When the transformed colors do not have the desired luminance, the color adjuster modifies the hues of transformed color to achieve the desired luminance. Specifically, the color adjuster modifies the transformed color using a weighted average to achieve the desired luminance while maintaining the hues of the original color to the extent possible. By substituting each original color with a transformed color that is adjusted as needed to reach the desired luminance, the overall brightness of the image is adjusted.

43 Claims, 7 Drawing Sheets
(3 of 7 Drawing Sheet(s) Filed in Color)

600

SYSTEM AND METHOD FOR IMAGE LUMINANCE TRANSFORMATION

FIELD OF THE INVENTION

This invention generally relates to display systems, and more specifically relates to luminance adjusting for displayed images.

BACKGROUND OF THE INVENTION

Various types of optical displays are commonly used in a wide variety of applications. For example, computing devices such as personal computers, workstations, and personal digital assistants (PDA) and communication devices such as mobile phones and radios all use various types of displays. Displays are also commonly used for a variety of purposes on vehicles such as automobiles and aircraft. Optical displays can use a variety of different display mechanisms, such as LCD, CRT, projection and other devices.

One new application in which optical displays are being applied is in aircraft avionics systems. For example, in an aircraft avionics application, a multi-function display can be used to provide a variety of different types of information to the pilot by dividing the display into a plurality of windows, and assigning each window a display task. For example, in a multi-function display one window can be assigned to display primary flight control information such as airspeed, attitude, altitude and horizontal situation. Another window can be used to provide navigation information such as heading and location. Another window can be used to provide information such as electrical, hydraulic, or cabin pressure values or status.

One important performance parameter in certain displays is the range of luminance that can be provided by a projection display, commonly referred to as the dimming range. In many applications it is critical that a display make information clearly visible in a wide variety of ambient light conditions. For example, a display used in an aircraft avionics system will need to display information to the pilot under lighting conditions that can range from near total blackness to the extreme glare created by facing directly into daytime sunlight. Such a display must be able to display images at a wide range of intensities. Without a sufficiently large range of intensities a viewer of the display may be unable to easily read information from the display in high ambient light conditions, low ambient light conditions, or both.

One important characteristic of certain images is the selection of colors to convey specific meaning, such as blue indicating water. For such images, it is desirable to leave the hue unchanged when adjusting displayed image brightness.

The content of the images displayed can have negative impacts on the ability to adjust the intensity of the displayed image without adversely affecting image quality. For example, when attempting to display an image that includes a large percentage of white or other light colors, the resulting bright light can degrade the pilot's night vision adaptation. Attempts to reduce the intensity by dimming the image can cause a significant loss of image quality. Specifically, uniformly dimming an image can cause a significant loss of contrast in the displayed image, causing elements of similar color and contrast to lose significantly readability. Furthermore, attempts to limit brightness of one window by dimming the entire display can negatively impact the view ability of other windows on the display.

Thus, what is needed is a system and method for altering a displayed image to reduce the overall intensity while maintaining good contrast and preserving the hues of the original image to the extent possible.

BRIEF SUMMARY OF THE INVENTION

The present invention provides an image conversion system for altering an image to adjust the overall brightness of the image when displayed. The image conversion system includes a luminance transformer and a color adjuster. To adjust the overall brightness of the image, the luminance transformer reverses the luminance of each original color in the image. Specifically, the original colors are each transformed to a transformed color, with each selected to have a new luminance at least proximate a desired luminance while maintaining the original color's hue. This causes colors of high luminance to become colors of low luminance and vice versa.

The new luminance of each transformed color is then compared to the desired luminance for that color. When the transformed colors do not have the desired luminance, the color adjuster modifies the hues of transformed color to achieve the desired luminance. Specifically, the color adjuster modifies the transformed color using a weighted average to achieve the desired luminance while maintaining the hues of the original color to the extent possible. By substituting each original color with a transformed color that is adjusted as needed to reach the desired luminance, the overall brightness of the image is adjusted while maintaining good contrast and the hues of the original color to the extent possible.

The image conversion system is particularly applicable to avionics displays where the system must be able to effectively display images over a wide range of ambient light conditions. Specifically, the image conversion system provides the ability to display images, in low ambient light without degrading the pilot's night vision adaptation, while maintaining good contrast and the hues of the original, where those images originally included a large percentage of white or other high-luminance colors.

BRIEF DESCRIPTION OF DRAWINGS

The patent or application file contains at least one drawing executed in color. Copies of this patent or patent application publication with color drawings will be provided by the Office upon request and payment of the necessary fee. The preferred exemplary embodiment of the present invention will hereinafter be described in conjunction with the appended drawings, where like designations denote like elements, and.

DETAILED DESCRIPTION OF THE INVENTION

The present invention provides an image conversion system and method for altering an image to adjust the overall brightness of the image when displayed. The system and method provide the ability to adjust the overall brightness while maintaining good contrast and the hues of the original color to the extent possible. The system is particularly applicable to avionics display systems.

Figure 1:
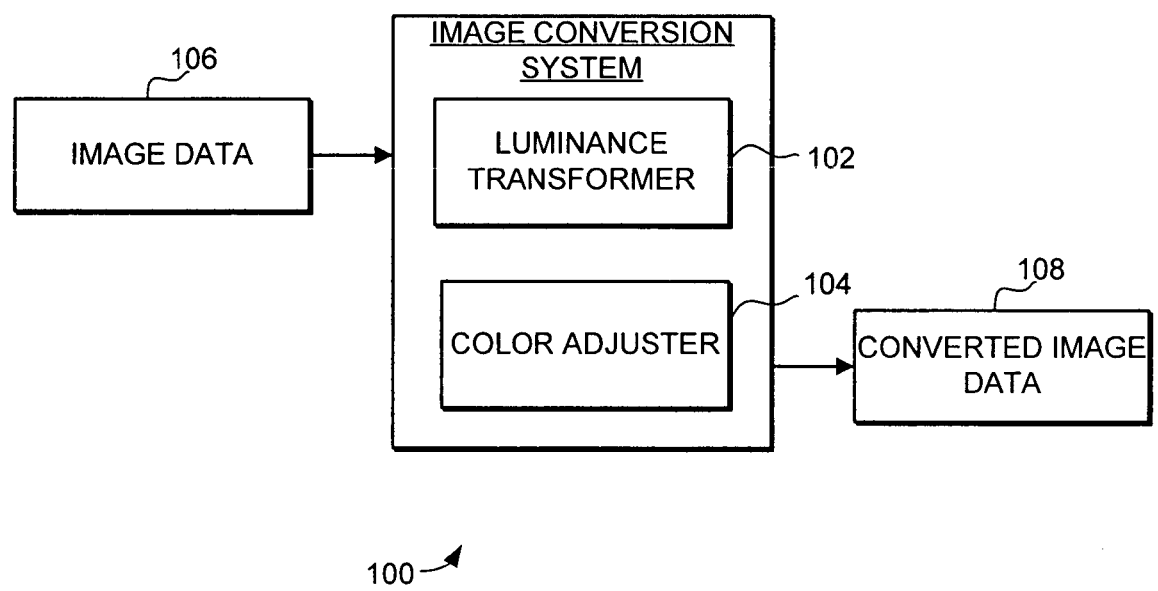
FIG. 1 is a schematic view of an image conversion system.

Turning now to FIG. 1, an image conversion system 100 is illustrated schematically. The image conversion system 100 includes a luminance transformer 102 and a color adjuster 104. The image conversion system 100 receives image data 106 and produces converted image data 108, with the converted image data resulting in a change in the overall brightness of the image when it is displayed. To adjust the overall brightness of the image, the luminance transformer 102 reverses the luminance of each original color in the image. Specifically, the original colors in the image data are each transformed to a transformed color, with each transformed color selected to have a new luminance at least proximate a desired luminance while maintaining the original color's hue. This causes colors of high luminance to become colors of low luminance and vice versa.

The new luminance of each transformed color is then compared to the desired luminance for that color. When the transformed colors do not have the desired luminance, the color adjuster 104 modifies the hues of transformed color to achieve the desired luminance. Specifically, the color adjuster 104 modifies the transformed color using a weighted average to achieve the desired luminance while maintaining the hues of the original color to the extent possible. By substituting each original color with a transformed color that is adjusted as needed to reach the desired luminance, the overall brightness of the image is adjusted while maintaining good contrast and the hues of the original color to the extent possible.

The image conversion system 100 is particularly applicable to avionics displays where the system must be able to effectively display images over a wide range of ambient light conditions. Specifically, the image conversion system 100 provides the ability to display images, in low ambient light without degrading the pilot's night vision adaptation, while maintaining good contrast and the hues of the original, where those images originally included a large percentage of white or other high-luminance colors.

As used in this specification, hue describes the appearance of the color independent of absolute or relative brightness, luminance describes the relative brightness of the color independent of color, and color includes both hue and luminance. This definition of luminance corresponds to luminance in the CIE color model, while hue corresponds in concept to chromaticity in the CIE color model. However, this invention does not require the use of the imaginary primaries of the CIE color model, so the specific term chromaticity is avoided. For common image formats, luminance is implicitly defined by magnitudes of the color components (real primary colors), and must be calculated as a function of the color components.

Figure 2:
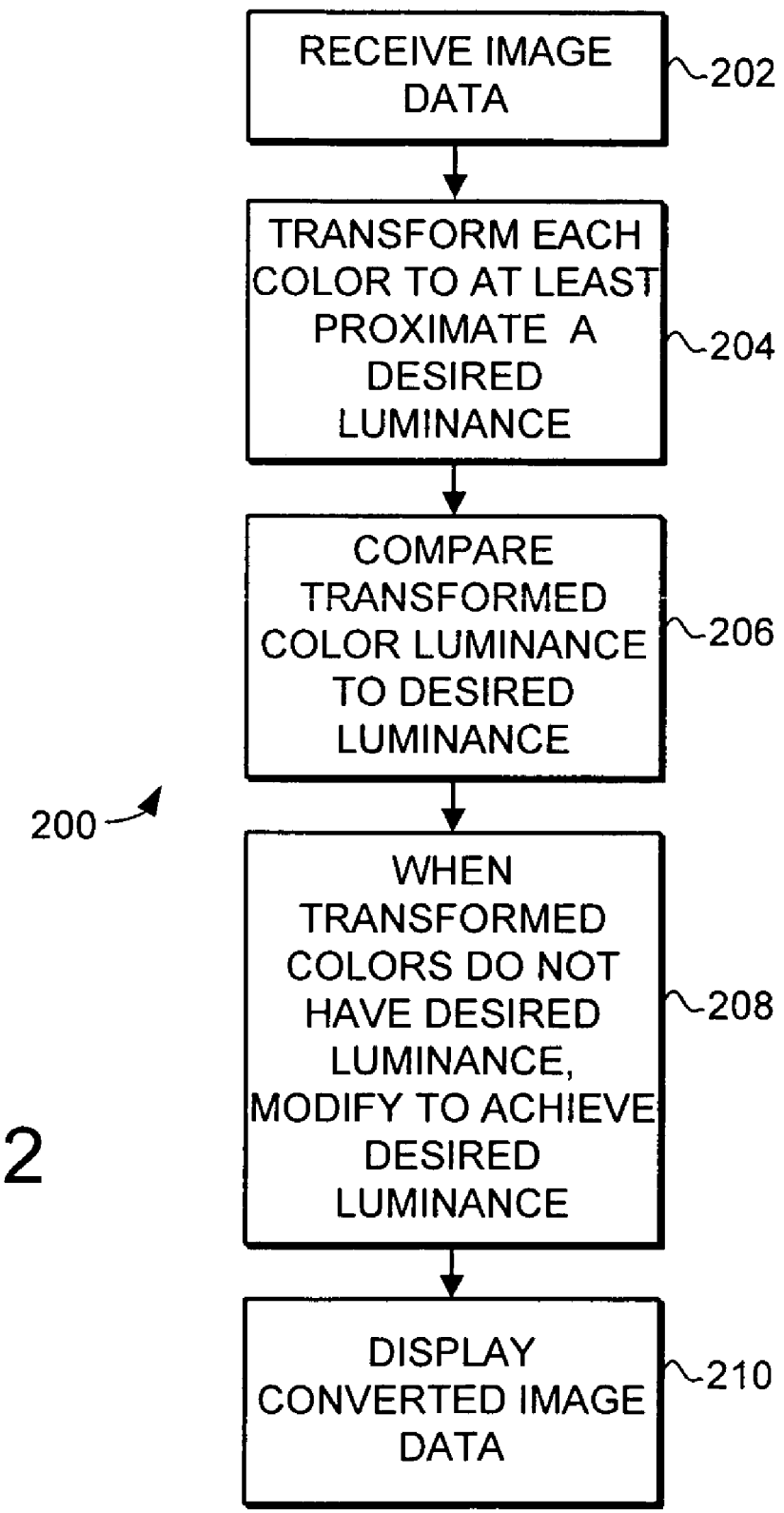
FIG. 2 is a flow diagram illustrating an image conversion method.

Turning now to FIG. 2, a method 200 for adjusting the brightness of a displayed image is illustrated. The first step 202 in method 200 is to receive the image data. The image data would include color information for the drawing, from which luminance for each color can be determined. The image data could be in a variety of formats, including standard image and video formats such as JPEG, GIF and BMP formats. Conversely, the image data can be in propriety format. In any case, the image data defines an image that is to be displayed and system, with that image data including both color and luminance information about the image. Furthermore step 202 of receiving the image data can comprise an actual file transfer of the image, or it can simply involve the extraction of color and luminance data that will be used in method 200.

The next step 204 is to transform each color in the image data to at least proximate a desired luminance. In general, this step comprises determining, for each original color in the image data, the desired luminance for a corresponding transform color. The desired luminance can be determined using a variety of techniques. In general, the desired luminance is selected to be the reverse of the original luminance. This serves the goal of adjusting the brightness of an image by making images that are bright darker, and making images that are dark brighter. One way to reverse the luminance is to define the desired luminance as the maximum luminance minus original color luminance, where the maximum luminance is the brightest luminance that can be defined using the image format and/or reproduced using the display system. Such a calculation results in a desired luminance that is the reverse of the original luminance. Another technique to reverse the luminance is to invert the original luminance. Of course, other techniques and variations on these techniques could also be used. In any case, the desired luminance can be calculated for each original color in the image data.

With the desired luminance calculated, the original color can be transformed to at least proximate the desired luminance. In this step, the original color is preferably transformed without modifying the hues of the original colors. As such, the transform will affect the luminance of the color, but the hues of the color will remain substantially unchanged. One method of transforming to at least proximate the desired luminance is to transform to the extent possible luminance within the constraints of an image display system or image definition format while maintaining hues of the original color. For example, transforming the luminance to the extent possible without exceeding the maximum value allowed for any color component.

Many common color formats use three or more color components to define a color. For example, some color formats use red, green and blue components to define each available color. Other color formats can use different or more color components. The amount of each color component included in a color is specified by a numerical value such as a real number from 0 to 1 inclusive, or an integer from 0 to 255 inclusive. Thus, a color can be defined as a vector of three components within the defined range, e.g., [0.3 0.6 0.9] or [77 153 230]. In such a format, no color component can be specified with a value of greater than the maximum value allowed in the format, e.g., 1 or 255.

When transforming a color to the desired luminance in some cases it would be impossible to achieve the desire luminance without exceeding the maximum component value for at least one component or without changing the relative balance of the components that define the color hue. In such a situation, the original color is preferably transformed to be as close as possible to the desired luminance without exceeding any component maximum value or changing the hue of the color.

For example, given color components defined as integers from 0 to 255, if a desired luminance and hue would be met with a color defined as [280 20 54], it would instead be transformed to be proximate the desired luminance by defining the transformed color as [255 18 49], where the transformed color thus does have any component that exceeds the maximum value and also has the correct color hue, but does not attain the desired luminance. Thus, step 204 transforms each original color to a transform color that is at least proximate the desired luminance.

With the original colors transformed, the next step 206 is to compare the transformed color luminance to the desired luminance. In most cases, step 204 would typically be able to transform the original color into a transformed color having the desired luminance. In that case, the new luminance of the transformed color would equal the desired luminance. As was discussed above, in other cases however, the original color cannot be transformed to the desired luminance without exceeding a maximum component value or changing the color hue. In this case, the transformed color luminance would be proximate to, but not equal to the desired luminance. In step 206 those transformed colors that do not have the desired luminance are identified.

The next step 208 is to modify the transformed colors that do have the desired luminance to achieve the desired luminance. In this step, the transformed colors are preferably modified in a way that preserves the contrast and color hues to the extent possible. This can be done using several techniques. For example, a weighted sum of the transformed color and the brightest available color can be used to determine how to modify the transformed color in a way that preserves contrast and color hues to the extent possible. In such a method, the transformed color is modified by multiplying a weighting factor to the transformed color and multiplying a second weighting factor to the brightest color and adding the results. In this method, the first and second weighting factors can be determined using a ratio of luminance differences between the brightest luminance, the desired luminance and the luminance of the transformed color. Thus, by modifying the transformed color in this way the transformed color is adjusted to have the desired luminance while the effects on hue is minimized.

The next step 210 is to display the converted image data. This can be accomplished by replacing every original color in the image with it corresponding transformed color, and displaying the image as converted. Specifically, each original color is replaced with its corresponding transformed color, including those transformed colors that were modified to have the desired luminance. Thus, every original color is replaced with a transformed color that has the desired luminance, with some transformed colors having the original hue and other transformed colors having a hue adjusted to achieve the desired luminance. By appropriately selecting the desired luminance for each original color, the resulting converted image data will have a significant change in overall brightness while maintaining hues to the extent possible.

The method 200 can be used to dim relatively bright images that include large percentages of white or other relatively high luminance colors. The method 200 is particularly applicable to avionics displays where the system must be able to effectively display images over a wide range of ambient light conditions. Specifically, method 200 provides the ability to dim these images while maintaining good contrast and the hues of the original. Thus, the images can be effectively displayed to the pilot in low ambient light without degrading the pilot's night vision adaptation.

Figure 3:
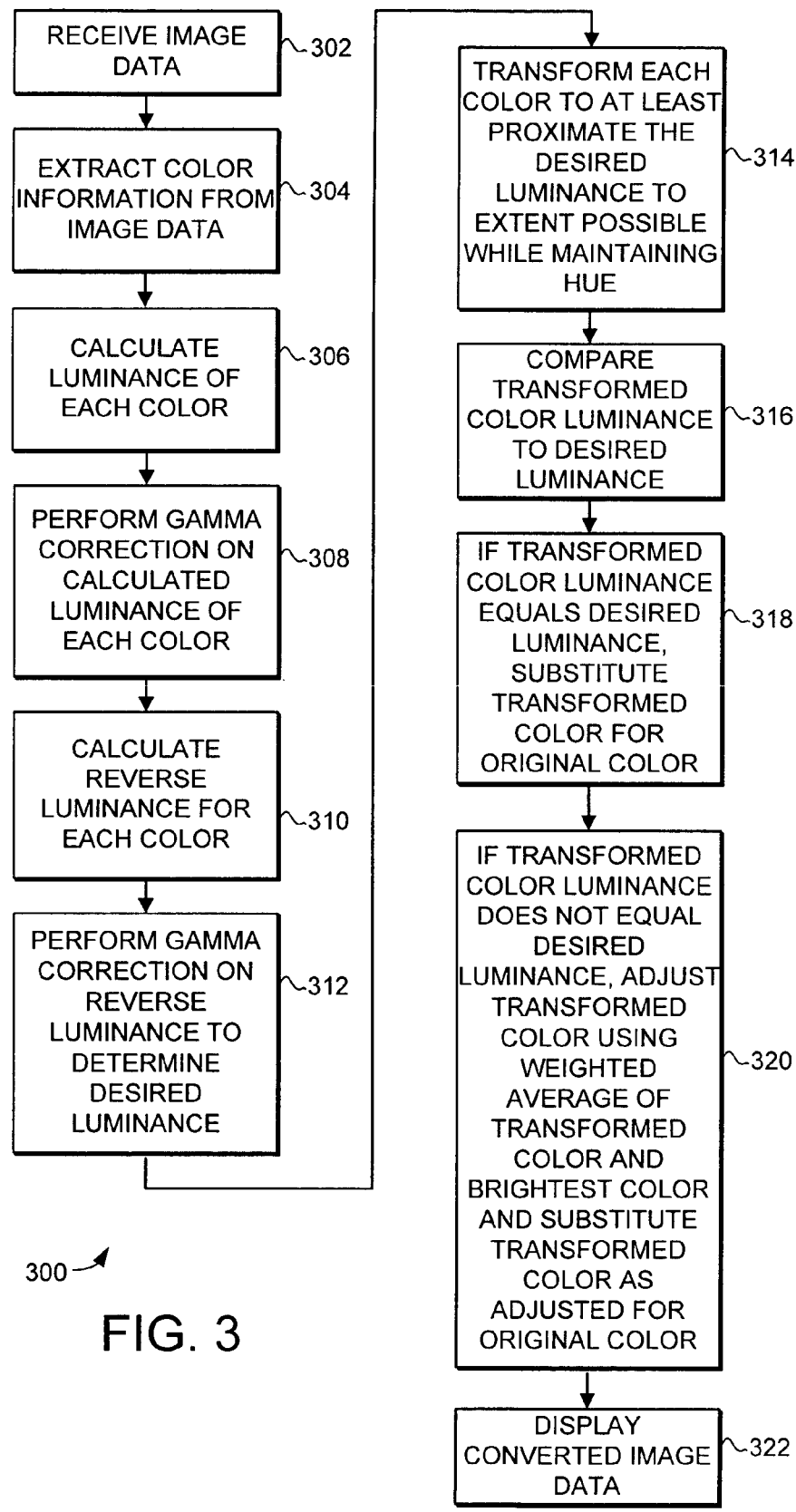
FIG. 3 is a flow diagram illustrating a second image conversion method.

Turning now to FIG. 3, a preferred method for dimming and displaying an image is illustrated. The method 300 is particularly applicable to the display of images in low ambient light conditions where a bright rendering of the image can negatively impact a user's night vision adaptation. For example, the method 300 is applicable to display of images that were rendered with white or other light background, such as images produced from documents that were originally created for reproduction on paper. Thus, the method 300 can be used to convert images of documents, such as map documents, into a format that provides for dimming of the displayed image. The method provides the ability to display the image while maintaining good contrast and the hues of the original.

The first step 302 in method 300 is again to receive the image data. The image data would include color and luminance information for the drawing. As one example, the image data 300 can include digital representations of documents originally designed for production on paper, and thus designed with a relatively white background in mind. The image data can again comprise data in a variety of types and formats, including public and proprietary format standards.

The next step 304 is to extract color information from the image data. One way to perform step 304 is to query the image data or image data system to produce a listing of all the original colors in the image that is to be displayed. Another way is to programmatically walk through the image data to produce a listing of colors in the image. Finally, in another method the colors can be extracted individually as the image is processed for display.

The next step 306 is to calculate the luminance of each original color in the image. The method of calculating the luminance would generally depend on the format in which the original color information is stored. For example, when the image data is stored in an RGB component color format, the luminance of each color can be calculated as a linear function of the three components in the RGB color representation. In some cases it will be desirable to convert the format of the color before calculating the luminance, such that each color component, and the calculated luminance are real numbers from 0.0 to 1.0 inclusive. For example, a color stored in three components of 0–255 can converted to real number components by dividing each component by 255. As one example, the luminance l of a color in RGB format can then be calculated as:

$$l = W_R R + W_G G + W_B B \qquad (1.)$$

Where $W_R$ is a red weight factor, $W_G$ is a green weight factor, $W_B$ blue weight factor, R is the red component value, G is the green component value, and B is the blue component value. Examples include $W_R$ equal to 0.299, $W_G$ equal to 0.587 and $W_B$ equal to 0.114. These weight factors are determined by the relative sensitivity of the normal human eye to these color components. Of course, this is just one example of how the luminance of each color can be calculated.

The next step 308 is to perform a gamma correction on the calculated luminance of each color. The gamma correction strongly affects the luminance separation among dark colors, while slightly affecting separation among moderate and light colors. Increasing luminance separation among dark colors will decrease luminance separation among moderate and light colors, and vice versa. The gamma correction can be accomplished by raising each luminance, represented by a real number from 0 to 1 inclusive, to a power. One example of a power that can be used at this step is $1.0/\gamma$, where $\gamma$ (gamma) is 1.3. This correction creates a greater separation between dark colors before the luminance of the colors is reversed. This will help create better separation of light colors after conversion, and will thus make white text more visible against colored backgrounds. The power selected would generally depend upon the type of hardware that is being used to display the image. An additional specific consideration is that darker colors are more likely to result in transformed colors that do not obtain the desired luminance after transformation. Increasing the separation of low luminance original colors from black results in a lower desired luminance for the transformed colors, and therefore less need for color adjustment. This gamma correction step thus allows for tradeoffs between maintaining contrast and maintaining accuracy of hue. This may be useful when certain pure colors (such as red) have specific meaning. Of course, other values could be used depending upon the application.

The next step 310 is to calculate a reverse luminance for each color. In general the method used to reverse the luminance is selected to achieve the goal of adjusting the brightness of an image by making images that are currently bright darker, and making images that dark brighter. One way to reverse the luminance is to calculate the maximum luminance minus original color luminance. Specifically, a reverse luminance r can be defined as:

$$r = m - l \quad (2.)$$

where m is the brightest luminance that can be defined using the image format and/or reproduced using the display system, and l is the luminance of the color as calculated in equation 1. When using color components in the range of 0.0 to 1.0, the value for m can be 1.0. Such a calculation results in a luminance that is the reverse of the original luminance. Thus, in step 310, the reverse luminance can be calculated for each color in the image data.

The next step 312 is to perform a gamma correction on the reverse luminance to determine a desired luminance. This gamma correction most strongly affects the low reverse luminances (the higher luminances before reversal) in the image. Specifically, each reverse luminance for each color is gamma corrected to define the desired luminance for a transformed color. The gamma correction of the reverse luminance is preferably selected to make the contrast of low reversed luminances against black similar to their pre-reversal contrast against white. The amount and direction of correction is generally dependent on the type of display hardware, and the amount of gamma correction applied in step 308. The result of gamma correction is a desired luminance. This is the desired luminance that will be manifest in the transformed color that corresponds to the original color in the image. It should be noted that in some cases it may be desirable to omit this gamma correction, or to perform the gamma correction to a power of 1. In those cases, the desired luminance will be equal to the reverse luminance.

The next step 314 is to transform each original color in the image to at least proximate the desired luminance to the extent possible while maintaining the hue of the original color. In this step, the original color is preferably transformed without modifying the hues of the original colors. As such, the transform will affect the luminance of the color, but the hues of the resulting transformed color will remain substantially unchanged. One method of transforming to at least proximate the desired luminance is to transform to the extent possible within the constraints of an image display system or image definition format while maintaining hues of the original color. For example, transforming the luminance to the extent possible without exceeding the maximum value allowed for any color component.

As one specific example, a transformed color T can be defined as:

$$T = S \cdot \min\left(\frac{d}{l}, \min\left(\frac{m_0}{s_0}, \frac{m_1}{s_1}, \ldots \frac{m_{n-1}}{s_{n-1}}\right)\right) \quad (3.)$$

where T is a vector representation of the transformed color, S is a vector representation of the original color, d is the desired luminance of the transformed color, l is the luminance of the original color, $m_0$–$m_{n-1}$ are the maximum color component values, and $s_0$–$s_{n-1}$ are the color component values for the original color. Equation 3 determines the transformed color T by multiplying the original color S by the minimum of a first value and a second value. The first value is the ratio of the desired luminance to the original luminance. The second value is the minimum of the ratios of each maximum color component value over the corresponding original color component value. Equation 3 results in a transformed color T that is transformed to be at least proximate the desired luminance d to the extent possible while maintaining the hue of the original color S, and without exceeding the maximum value allowed for any color component. By calculating equation 3 for each original color in an image, a corresponding transformed color for each original color can be defined.

With the original colors transformed, the next step 316 is to compare the transformed color luminance to the desired luminance. In many cases, step 314 would typically be able to transform the original color into a transformed color having the desired luminance. In that case, the new luminance of the transformed color would equal the desired luminance. As was discussed above, in other cases however, the original color cannot be transformed to the desired luminance without exceeding a maximum component value or without changing the color hue. In this case, the transformed color luminance would be proximate to, but not equal to the desired luminance. When using equation 3, if the first value (i.e., ratio of desired luminance to the original luminance) is greater than the second value (i.e., minimum of component ratios), the transformed color luminance will be less than the desired luminance. In step 316 those transformed colors that do not have the desired luminance are identified.

In the next step 318, if the transformed color luminance equals the corresponding desired luminance, the transformed color is substituted for the original color. This replaces some of the original colors in the image data with transformed colors having a reverse luminance but the color hues of the original color.

In the next step 320, if the transformed color luminance does not equal the corresponding desired luminance, the transformed color is adjusted using a weighted average of the transformed luminance and the desired luminance. The modified transformed color is then substituted for the corresponding original color. This step replaces the remaining original colors in the image. It should also be noted that the transformation, adjustment, and substitution of individual colors in the image can be performed in any suitable order. For example, all colors could be transformed before any transformed colors were adjusted, and all transformed colors adjusted as necessary before any colors were substituted. Conversely, transformation, adjustment, and substitution could be performed on a color by color basis. Alternatively, operations could be performed by spatial portion in the image.

Several techniques can be used to adjust the transformed color using a weighted average of the transformed luminance and the desired luminance. In this step, the transformed colors are preferably modified in a way that preserves the contrast and color hues to the extent possible. For example, the transformed color is modified by multiplying a weighting factor to the transformed color and multiplying a second weighting factor to the brightest color and adding the results. Thus the modified transformed color $T_{MOD}$ can be defined as:

$$T_{MOD} = k \cdot T + (1-k) \cdot M \tag{4.}$$

where k is a weighting factor, T is the transformed color, and M is the maximum brightness color, typically white, and typically defined by each color component having its maximum value. The weighting factor k can be defined as:

$$k = \frac{m-d}{m-t} \tag{5.}$$

where m is a maximum luminance (i.e., the luminance of M), d is the desired luminance, and t was the luminance of the transformed color T.

Thus, in equations 4 and 5, the k and (1−k) comprise first and second weighting factors that are determined using a ratio of luminance differences between the brightest luminance, the desired luminance and the luminance of the transformed color. By using a weighted average of the transformed luminance and the desired luminance with such defined weighting factors, the transformed color is adjusted to have the desired luminance while the affects on hue and contrast are reduced.

The next step 322 is to display the converted image data. This is done by using the transformed colors, modified as needed, for the corresponding original colors in the image data, and displaying the image as converted. Specifically, each original color is replaced with its corresponding transformed color, including those transformed colors that were modified to have the desired luminance in step 320. Thus, every original color is replaced with a transformed color that has the desired luminance, with some transformed colors having the original hue and other transformed colors having a hue adjusted to achieve the desired luminance. By appropriately selecting the desired luminance for each original color, the resulting converted image data will have a significant change in overall brightness while maintaining hues to the extent possible.

Figure 4:
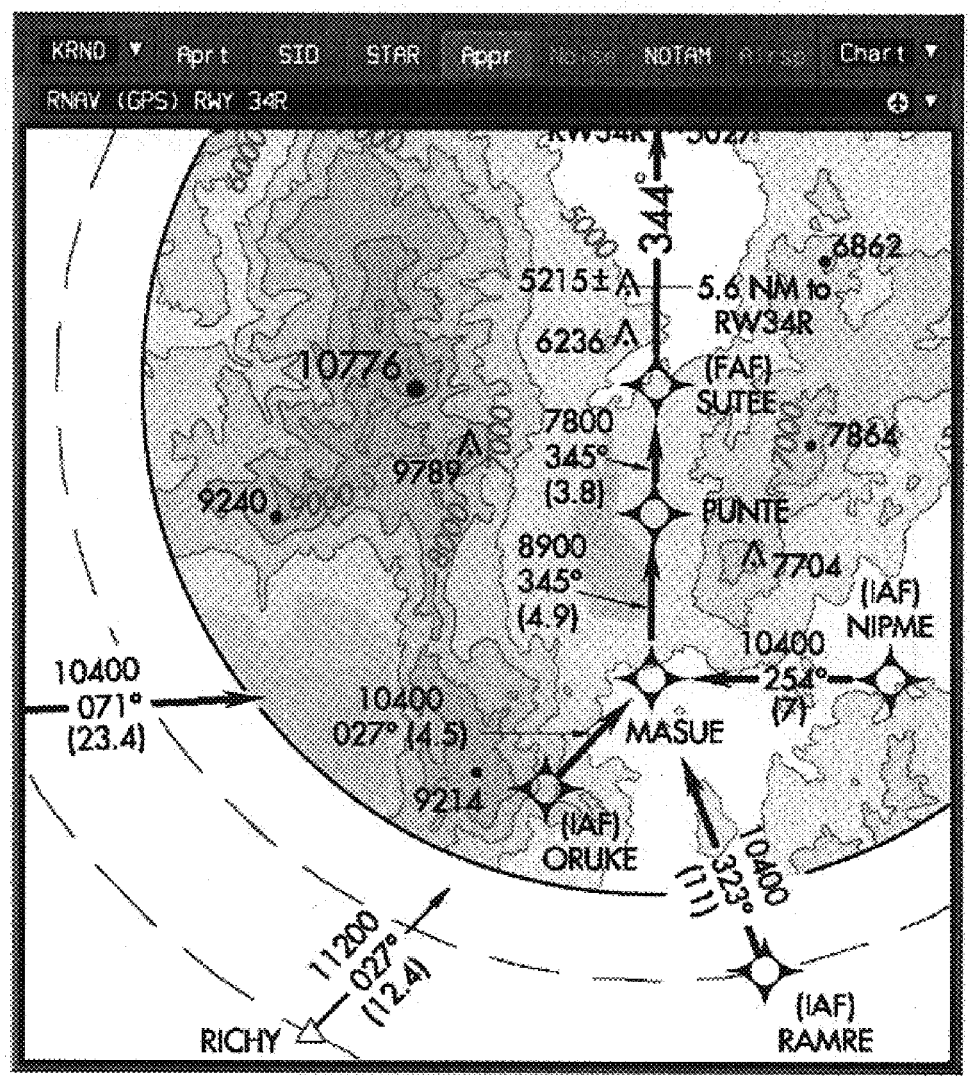
FIG. 4 is a view of an exemplary image.

The method 300 is particularly applicable to the display of images in low ambient light conditions where a bright rendering of the image can negatively impact a user's night vision adaptation. As stated above, the method 300 is applicable to display of images that were rendered with white or other light background, such as images produced from documents that were originally created for reproduction on paper. Turning now to FIG. 4, an exemplary image 400 is illustrated. The image 400 is a representation of a window on an avionics display that is displaying a map. The map illustrated is an approach chart, which is sometimes produced in a paper format. Of course, the system and method can be applied to different types of images on the display, and is not limited to maps. The approach chart illustrates many features that are important to a pilot. For example, the approach chart illustrates tracking approach lines that an aircraft is to use when entering the airport. The approach chart also illustrates key geographical features, including bodies of water and the topography of mountains. These features are represented by colors that are selected for contrast and readability, as well as for their inherent ability to identify features. Thus, water is illustrated in shades of blue, while mountains are illustrated in earth-tone shades.

One feature of the image 400 is the high percentage of white and other high luminance colors in the image. This results in an image that has a relatively high overall brightness. When such an image is displayed in low ambient light conditions, the brightness of the image 400 can interfere with the ability to see other screens, and can interfere with the pilots night adapted vision.

Figure 5:
FIG. 5 is a view of an exemplary converted image.

Turning now to FIG. 5, an exemplary converted image 500 is illustrated. The image 500 is image 400 having been converted using method 300 described above. The method 300 replaces the original colors in the image 400 with transformed colors that have a reverse luminance selected to reduce the overall brightness of the image, while maintaining the color hues of the original to the extent possible.

In image 500, the areas of bright white have been replaced with black, and vice versa. Bright colors have been substituted with dark colors of the same hue, to the extent possible. The result is an image 500 that is substantially less bright, and thus can be viewed in low ambient light conditions without degrading night vision adaptation. Furthermore, the image 500 maintains the good contrast and the hues of the original image 400. Thus, water features remain illustrated in shades of blue, and topographical features are likewise appropriately colored.

Figure 6:
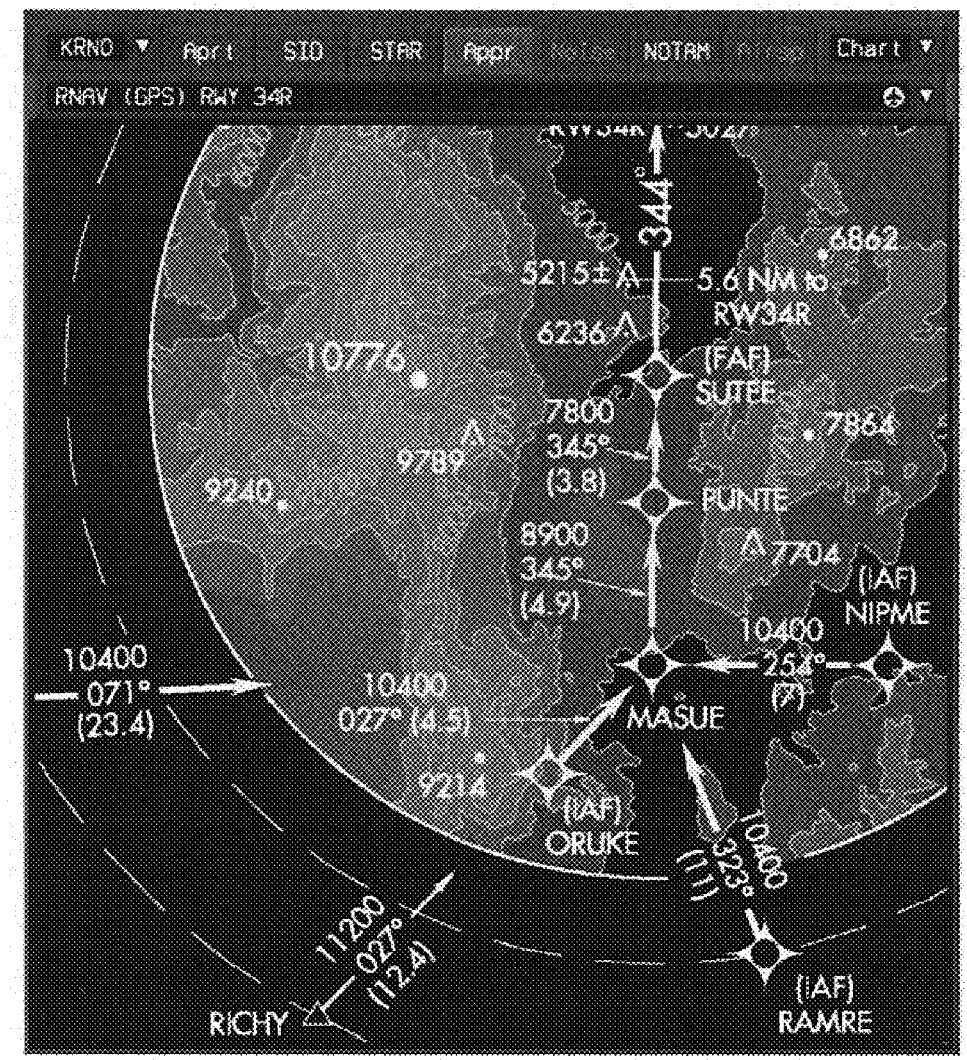
FIG. 6 is a view of an exemplary negated image.

Turning now to FIG. 6, a second converted image 600 is illustrated. Image 600 was converted using a simple negative color approach, where each color component is subtracted from the corresponding maximum component value. While image 600 also has reduced brightness, and it maintains contrast, it suffers from distinct disadvantages. In particular, image 600 has had significant changes in color hues. Mountains are now illustrated in blues, while water is illustrated in earth-tones. Such an image is inherently undesirable for the potential to create confusion. Furthermore, the changing of color hues can result in colors that have defined meaning losing their ability to convey important information.

Figure 7:
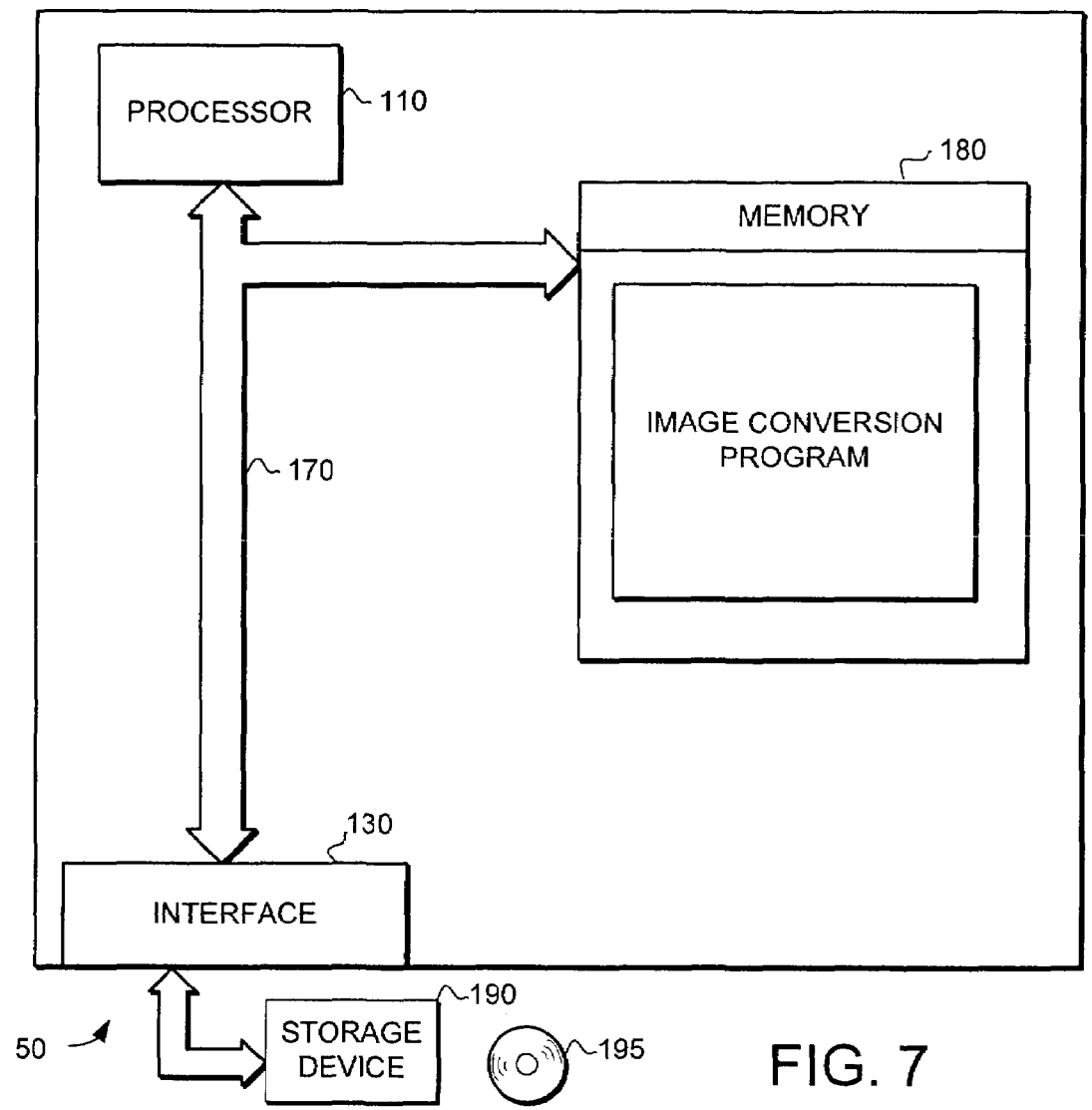
FIG. 7 is a schematic view an exemplary computer system including an image conversion program.

The image conversion system and method can be implemented in wide variety of platforms. Turning now to FIG. 7, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft or other vehicles. The exemplary computer system 50 includes a processor 110, an interface 130, a storage device 190, a bus 170 and a memory 180. In accordance with the preferred embodiments of the invention, the computer system 50 includes an image conversion program, which includes a luminance transformer and color adjuster.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 7, storage device 190 can comprise a disc drive device that uses discs 195 to store data.

In accordance with the preferred embodiments of the invention, the computer system 50 includes an image conversion program. Specifically during operation, the image conversion program is stored in memory 180 and executed by processor 110. When being executed by the processor 110, the image conversion program receives image data and converts the image data to change the overall brightness of the image.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides an image conversion system for altering an image to adjust the overall brightness of the image when displayed. The image conversion system includes a luminance transformer and a color adjuster. To adjust the overall brightness of the image, the luminance transformer reverses the luminance of each original color in the image. Specifically, the original colors are each transformed to a transformed color, with each selected to have a new luminance at least proximate a desired luminance while maintaining the original color's hue. This causes colors of high luminance to become colors of low luminance and vice versa. The new luminance of each transformed color is then compared to the desired luminance for that color. When the transformed colors do not have the desired luminance, the color adjuster modifies the hues of transformed color to achieve the desired luminance. Specifically, the color adjuster modifies the transformed color using a weighted average to achieve the desired luminance while maintaining the hues of the original color to the extent possible. By substituting each original color with a transformed color that is adjusted as needed to reach the desired luminance, the overall brightness of the image is adjusted while maintaining good contrast and the hues of the original color to the extent possible.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An image conversion system for altering an image to adjust the overall brightness of the image when displayed, the image conversion system comprising:
   a luminance transformer, the luminance transformer receiving image data, the luminance transformer transforming each original color in the image data to a transformed color having a new luminance, the new luminance selected to be at least proximate to a desired luminance while maintaining hues of the original color; and
   a color adjuster, the color adjuster modifying the transformed color to achieve the desired luminance in the transformed color if the new luminance does not equal the desired luminance, and wherein the color adjuster modifies the transformed color using a weighted sum of the transformed color and a brightest color.

2. The system of claim 1 wherein the luminance transformer selects the new luminance to be as close as possible to the desired luminance within constraints of an image display system while maintaining hues of the original color.

3. The system of claim 1 wherein the luminance transformer selects each transformed color to have a maximum allowed value for at least one color component if the new luminance for the transformed color does not have the desired luminance for the transformed color.

4. The system of claim 1 wherein the luminance transformer selects each transformed color according to the equation $$T = S \cdot \min\left(\frac{d}{l}, \min\left(\frac{m_0}{s_0}, \frac{m_1}{s_1}, \ldots \frac{m_{n-1}}{s_{n-1}}\right)\right)$$

where T is a vector representation of the transformed color, S is a vector representation of the original color, d is the desired luminance of the transformed color, l is a luminance of the original color, $m_0$–$m_{n-1}$ are maximum color component values, and $s_0$–$s_{n-1}$ are color component values for the original color.

5. An image conversion system for altering an image to adjust the overall brightness of the image when displayed, the image conversion system comprising:
   a luminance transformer, the luminance transformer receiving image data, the luminance transformer transforming each original color in the image data to a transformed color having a new luminance, the new luminance selected to be at least proximate to a desired luminance while maintaining hues of the original color, wherein the desired luminance for each transformed color is calculated by subtracting an original luminance for a corresponding original color from a maximum luminance; and
   a color adjuster, the color adjuster modifying the transformed color to achieve the desired luminance in the transformed color if the new luminance does not equal the desired luminance.

6. The system of claim 1 wherein the luminance transformer further performs a gamma correction for each original color to increase separation among relatively low luminance original colors.

7. The system of claim 1 wherein the luminance transformer calculates an original luminance for each original color, and wherein the luminance transformer performs a gamma correction on each calculated original luminance, and wherein the desired luminance for each transformed color is calculated by subtracting the gamma corrected original luminance for a corresponding original color from a maximum luminance.

8. The system of claim 1 wherein the luminance transformer calculates an original luminance for each original color, and wherein the luminance transformer performs a gamma correction on each calculated original luminance, and wherein luminance transformer calculates a reverse luminance for each original color by subtracting the gamma corrected original luminance for each original color from a maximum luminance, and wherein the luminance transformer calculates the desired luminance for each transformed color by performing a second gamma correction on the reverse luminance for each original color.

9. The system of claim 5 wherein the color adjuster modifies the transformed color using a weighted sum of the transformed color and a brightest color.

10. The system of claim 5 wherein the color adjuster modifies the transformed color by multiplying the transformed color by a weight factor k, and adding (1−k) times a brightest color, where the factor k is defined as:

$$k = \frac{m-d}{m-t},$$

where
   m is a maximum luminance, d is the desired luminance, and t is the new luminance.

11. The system of claim 1 wherein the image conversion system creates a table to facilitate color substitution of the original colors with the transformed colors.

12. The system of claim 1 wherein the image conversion system is part of an avionics display system.

13. The system of claim 1 wherein the image data comprises map data.

14. A method of converting an image to adjust overall brightness of the image when displayed, the method comprising the steps of:
   a) receiving image data defining the image, the image data including a plurality of original colors;
   b) transforming each of the plurality of colors to a corresponding one of a plurality of transformed colors, each of the plurality of transformed colors having a new luminance at least proximate a corresponding desired luminance;
   c) comparing the new luminance of each of the plurality of transformed colors to its corresponding desired luminance;
   d) selectively modifying any of the plurality of transformed colors that do not have the corresponding desired luminance to achieve the desired corresponding luminance, wherein the step of selectively modifying any of the plurality of transformed colors that do not have the corresponding desired luminance to achieve the desired corresponding luminance comprises modifying using a weighted sum of the transformed color and a brightest color; and
   e) displaying the image using the plurality of transformed colors as selectively modified.

15. The method of claim 14 wherein the new luminance for each of the plurality of transformed colors is selected to be as close as possible to the corresponding desired luminance within constraints of an image display system while maintaining hues of the corresponding original color.

16. The method of claim 14 wherein the step of transforming each of the plurality of colors to a corresponding one of a plurality of transformed colors comprises selecting the plurality of transformed colors to have a maximum allowed value for at least one color component if the new luminance for the transformed color does not equal the desired luminance for the transformed color.

17. The method of claim 14 wherein the step of transforming each of the plurality of colors to a corresponding one of a plurality of transformed colors comprises selecting each transformed color according to the equation $$T = S \cdot \min\left(\frac{d}{l}, \min\left(\frac{m_0}{s_0}, \frac{m_1}{s_1}, \ldots \frac{m_{n-1}}{s_{n-1}}\right)\right)$$

where T is a vector representation of the transformed color, S is a vector representation of the original color, d is the desired luminance of the transformed color, l is a luminance of the original color, $m_0$–$m_{n-1}$ are maximum color component values, and $s_0$–$s_{n-1}$ are color component values for the original color.

18. A method of converting an image to adjust overall brightness of the image when displayed, the method comprising the steps of:
   a) receiving image data defining the image, the image data including a plurality of original colors;
   b) transforming each of the plurality of colors to a corresponding one of a plurality of transformed colors, each of the plurality of transformed colors having a new luminance at least proximate a corresponding desired luminance;
   c) selecting a desired luminance for each transformed color, wherein the desired luminance for each transformed color is calculated by subtracting an original luminance for a corresponding original color from a maximum luminance;
   d) comparing the new luminance of each of the plurality of transformed colors to its corresponding desired luminance;

e) selectively modifying any of the plurality of transformed colors that do not have the corresponding desired luminance to achieve the desired corresponding luminance; and f) displaying the image using the plurality of transformed colors as selectively modified.

19. The method of claim 14 further comprising the step of performing a gamma correction for each original color to increase separation among relatively low luminance original colors.

20. The method of claim 14 further comprising the step of calculating an original luminance for each original color, and further comprising the step of performing a gamma correction on each calculated original luminance, and further comprising the step of calculating the desired luminance for each transformed color by subtracting the gamma corrected original luminance for a corresponding original color from a maximum luminance.

21. The method of claim 14 further comprising the step of calculating an original luminance for each original color, and further comprising the step of performing a gamma correction on each calculated original luminance, and further comprising the step of calculating a reverse luminance for each transformed color by subtracting the gamma corrected original luminance for a corresponding original color from a maximum luminance, and wherein the desired luminance for each transformed color is calculated by performing a second gamma correction on the reverse luminance for each original color.

22. The method of claim 18 wherein the step of selectively modifying any of the plurality of transformed colors that do not have the corresponding desired luminance to achieve the desired corresponding luminance comprises modifying using a weighted sum of the transformed color and a brightest color.

23. The method of claim 18 wherein the step of selectively modifying any of the plurality of transformed colors that do not have the corresponding desired luminance to achieve the desired corresponding luminance comprises multiplying the transformed color by a weight factor k, and adding (1−k) times a brightest color, where the factor k is defined as:

$$k = \frac{m-d}{m-t},$$

where
m is a maximum luminance, d is the desired luminance, and t is the new luminance.

24. The method of claim 14 further comprising the step of creating a table to facilitate color substitution of the original colors with the transformed colors.

25. The method of claim 14 wherein the step of displaying the image using the plurality of transformed colors as selectively modified comprises displaying on an avionics display system.

26. The method of claim 14 wherein image data comprises map data.

27. A program product comprising:
a) an image conversion program for altering an image to adjust the overall brightness of the image when displayed, the image conversion program comprising:
a luminance transformer, the luminance transformer receiving image data, the luminance transformer transforming each original color in the image data to a transformed color having a new luminance, the new luminance selected to be at least proximate to a desired luminance while maintaining hues of the original color; and
a color adjuster, the color adjuster modifying the transformed color to achieve the desired luminance in the transformed color if the new luminance does not equal the desired luminance, and wherein the color adjuster modifies the transformed color using a weighted sum of the transformed color and a brightest color; and b) computer-readable signal bearing media bearing said image conversion program.

28. The program product of claim 27 wherein the computer-readable signal bearing media comprises recordable media.

29. The program product of claim 27 wherein the computer-readable signal bearing media comprises transmission media.

30. The program product of claim 27 wherein the luminance transformer selects the new luminance to be as close as possible to the desired luminance within constraints of an image display system while maintaining hues of the original color.

31. The program product of claim 27 wherein the luminance transformer selects each transformed color to have a maximum allowed value for at least one color component if the new luminance for the transformed color does not have the desired luminance for the transformed color.

32. A program product comprising:
a) an image conversion program for altering an image to adjust the overall brightness of the image when displayed, the image conversion program comprising:
a luminance transformer, the luminance transformer receiving image data, the luminance transformer transforming each original color in the image data to a transformed color having a new luminance, the new luminance selected to be at least proximate to a desired luminance while maintaining hues of the original color, and wherein the desired luminance for each transformed color is calculated by subtracting an original luminance for a corresponding original color from a maximum luminance; and
a color adjuster, the color adjuster modifying the transformed color to achieve the desired luminance in the transformed color if the new luminance does not equal the desired luminance; and b) computer-readable signal bearing media bearing said image conversion program.

33. The program product of claim 27 wherein the luminance transformer selects each transformed color according to the equation $$T = S \cdot \min\left(\frac{d}{l}, \min\left(\frac{m_0}{s_0}, \frac{m_1}{s_1}, \ldots \frac{m_{n-1}}{s_{n-1}}\right)\right)$$

where T is a vector representation of the transformed color, S is a vector representation of the original color, d is the desired luminance of the transformed color, l is a luminance of the original color, $m_0$–$m_{n-1}$ are maximum color component values, and $s_0$–$s_{n-1}$ are color component values for the original color.

34. The program product of claim 27 wherein the luminance transformer further performs a gamma correction for each original color to increase separation among relatively low luminance original colors.

35. The program product of claim 27 wherein the luminance transformer calculates an original luminance for each original color, and wherein the luminance transformer performs a gamma correction on each calculated original luminance, and wherein the desired luminance for each transformed color is calculated by subtracting the gamma corrected original luminance for a corresponding original color from a maximum luminance.

36. The program product of claim 27 wherein the luminance transformer calculates an original luminance for each original color, and wherein the luminance transformer performs a gamma correction on each calculated original luminance, and wherein luminance transformer calculates a reverse luminance for each original color by subtracting the gamma corrected original luminance for each original color from a maximum luminance, and wherein the luminance transformer calculates the desired luminance for each transformed color by performing a second gamma correction on the reverse luminance for each original color.

37. The program product of claim 32 wherein the color adjuster modifies the transformed color using a weighted sum of the transformed color and a brightest color.

38. The program product of claim 32 wherein the color adjuster modifies the transformed color by multiplying the transformed color by a weight factor k, and adding (1−k) times a brightest color, where the factor k is defined as:

$$k = \frac{m-d}{m-t},$$

where
m is a maximum luminance, d is the desired luminance, and t is the new luminance.

39. The program product of claim 27 wherein the image conversion system creates a table to facilitate color substitution of the original colors with the transformed colors.

40. The program product of claim 27 wherein the image conversion system is part of an avionics display system.

41. The program product of claim 27 wherein the image data comprises map data.

42. An image conversion system for altering an image of a map in an avionics display, the image conversion system selectively reducing overall brightness of the image when displayed on the avionics display, the image conversion system comprising:

a luminance transformer, the luminance transformer receiving image data of an avionics map, the luminance transformer transforming each original color in the image data to a transformed color having a new luminance, the new luminance selected to be at least proximate to a desired luminance selected to reduce the overall brightness of the image when displayed on the avionics display while maintaining hues of the original color, and wherein the desired luminance for each transformed color is calculated by subtracting an original luminance for a corresponding original color from a maximum luminance; and a color adjuster, the color adjuster modifying the transformed color to achieve the desired luminance in the transformed color if the new luminance does not equal the desired luminance, and wherein the color adjuster modifies the transformed color using a weighted sum of the transformed color and a brightest color.

43. The system of claim 42 wherein the luminance transformer selects each transformed color according to the equation $$T = S \cdot \min\left(\frac{d}{l}, \min\left(\frac{m_0}{s_0}, \frac{m_1}{s_1}, \ldots \frac{m_{n-1}}{s_{n-1}}\right)\right)$$

where T is a vector representation of the transformed color, S is a vector representation of the original color, d is the desired luminance of the transformed color, l is a luminance of the original color, $m_0$–$m_{n-1}$ are maximum color component values, and $s_0$–$s_{n-1}$ are color component values for the original color, and wherein the color adjuster modifies the transformed color by multiplying the transformed color by a weight factor k, and adding (1−k) times a brightest color, where the factor k is defined as:

$$k = \frac{m-d}{m-t},$$

where
m is a maximum luminance, d is the desired luminance, and t is the new luminance.

* * * * *